(12) United States Patent
Chang

(10) Patent No.: US 8,142,013 B2
(45) Date of Patent: Mar. 27, 2012

(54) GLASSES STRUCTURE

(75) Inventor: Tuo-Liu Chang, Taipei (TW)

(73) Assignee: Mei-Yueh Hou (TW)

( * ) Notice: Subject to any disclaimer, the term of this patent is extended or adjusted under 35 U.S.C. 154(b) by 96 days.

(21) Appl. No.: 12/817,678

(22) Filed: Jun. 17, 2010

(65) Prior Publication Data

US 2011/0222018 A1    Sep. 15, 2011

(30) Foreign Application Priority Data

Mar. 12, 2010  (TW) .............................. 99204381 U

(51) Int. Cl.
*G02C 5/14* (2006.01)

(52) U.S. Cl. .......................... 351/114; 351/121; 351/132

(58) Field of Classification Search ................. 351/111, 351/113, 114, 116, 119, 121, 131–136, 138
See application file for complete search history.

(56) References Cited

U.S. PATENT DOCUMENTS 7,540,608 B2 *  6/2009  Carlon ......................... 351/153

* cited by examiner

*Primary Examiner* — Huy K Mai
(74) *Attorney, Agent, or Firm* — Cantor Colburn LLP

(57) ABSTRACT

A glasses structure includes a frame, two temple arms and a bridge. The frame has two end portions arranged at lateral sides thereof and a middle portion connecting the two end portions. Each temple has a elastic engagement member at a front end thereof for clamping the respective end portion of the frame. The bridge has a elastic clip member clamping the middle portion of the frame. Therefore, the temple arms and the bridge could link to the frame without screw members.

10 Claims, 6 Drawing Sheets

GLASSES STRUCTURE

BACKGROUND OF THE INVENTION

1. Field of the Invention

The present invention relates to a glasses structure, in particular, to a screw-less glasses structure.

2. Description of Related Art

Conventional eye glasses connect the major structural elements, such as the frame, the temples arms, and the bridges, with tiny little screws. However, the screws may easily loosen or fall off after a period of use, causing inconvenience to the users.

SUMMARY OF THE INVENTION

In view of the aforementioned issues, a glasses structure is disclosed. The issue is to create a glasses structure being able to link the parts together without screws.

To achieve the above-mentioned objectives, the present invention provides a glasses structure includes a frame, two temple arms and a bridge. The frame has two end portions arranged at lateral sides thereof and a middle portion connecting the two end portions. Each temple has an elastic engagement member at a front end thereof for clamping the respective end portion of the frame. The bridge has an elastic clip member clamping the middle portion of the frame.

It is worth mentioning that there are some advantages as follows: the temple arms are linked to the frame via the elastic engagement members; the bridge is linked to the frame via the clip member. The parts of the glasses structure are linked together without screw members or means of soldering; it brings to the convenient assembly of the glasses structure without looseness and departure. Therefore, the user can wear the present glasses with convenience and comfort.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
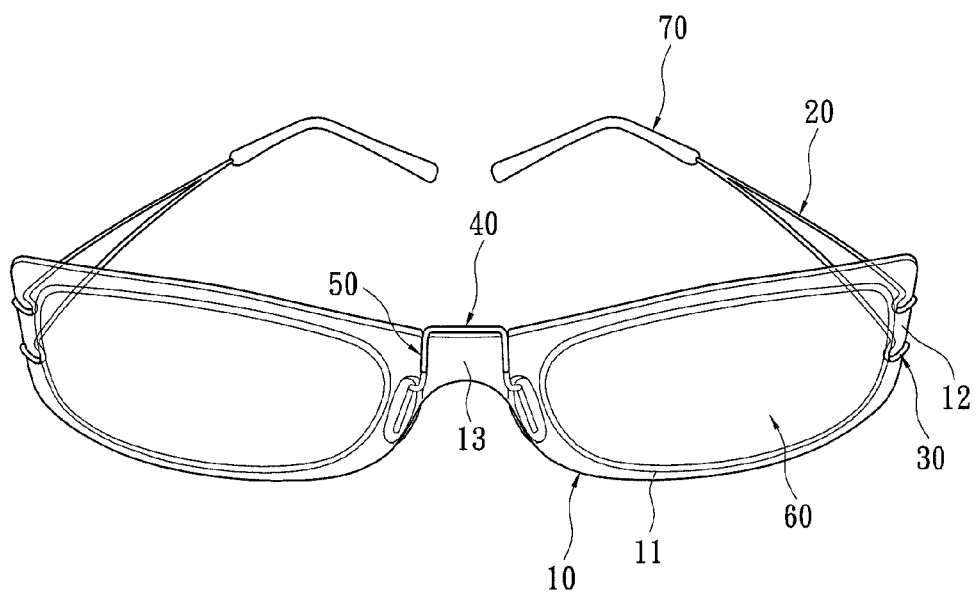
FIG. 1 is a perspective view of a glasses structure in accordance with a first preferred embodiment according to the present invention.
Figure 2:
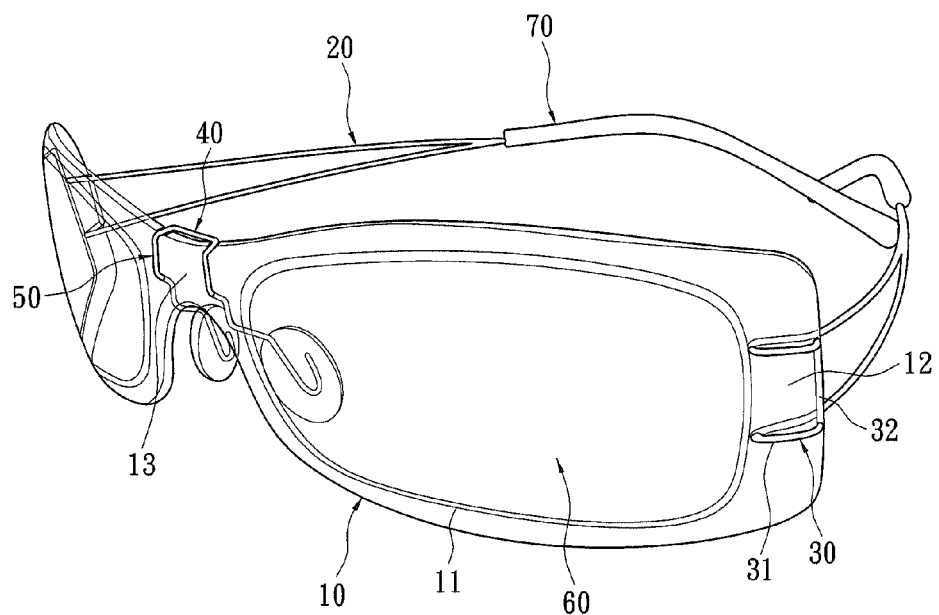
FIG. 2 is a perspective view from another angle of a glasses structure in accordance with a first preferred embodiment according to the present invention.

Referring to FIGS. 1 and 2, which show the glasses structure in accordance with a first embodiment. The glasses structure includes a frame 10, a pair of temple arms 20 and a bridge 40. The frame 10 includes end portions 12 arranged at the right and the left sides, a middle portion 13 connecting the end portions 12, and two lens fitting portions 11 adjacent to the end portions 12 respectively. Each lens fitting portion 11 accommodates a lens 60.

Each temple arm 20 has an elastic engagement member 30 at a front end thereof. The elastic engagement member 30 is made of flexible materials and is capable of being engaged onto the end portion 12 of the frame 10. Although the elastic engagement member 30 in the instant embodiment has an integrated one-piece structure, the structure of the elastic engagement member 30 is not limited by the illustrated figures. Each temple arm 20 has a tip 70. The tip 70 is sleeved at the end to increase wearing comfort for the users.

The bridge 40 includes an elastic clip member 50 made of flexible materials. The bridge 40 is capable of clamping onto the middle portion 13 of the frame 10.

Figure 3:
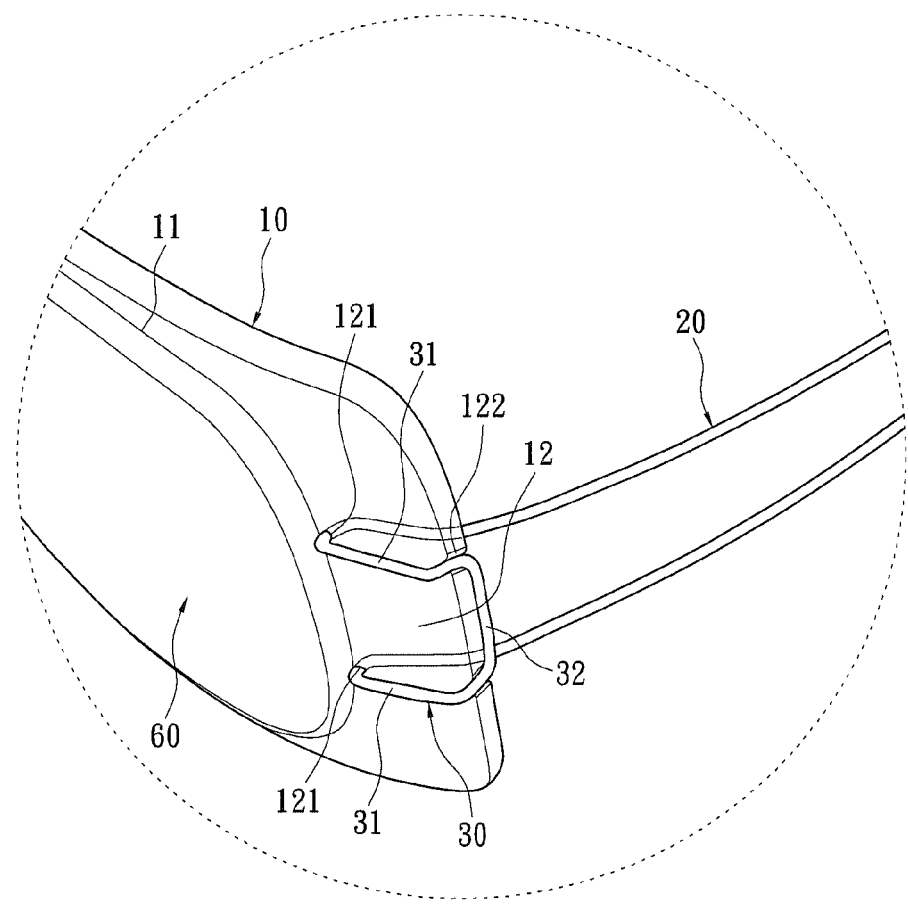
FIG. 3 is an enlarged view of a frame and a temple in accordance with a first preferred embodiment according to the present invention.
Figure 4:
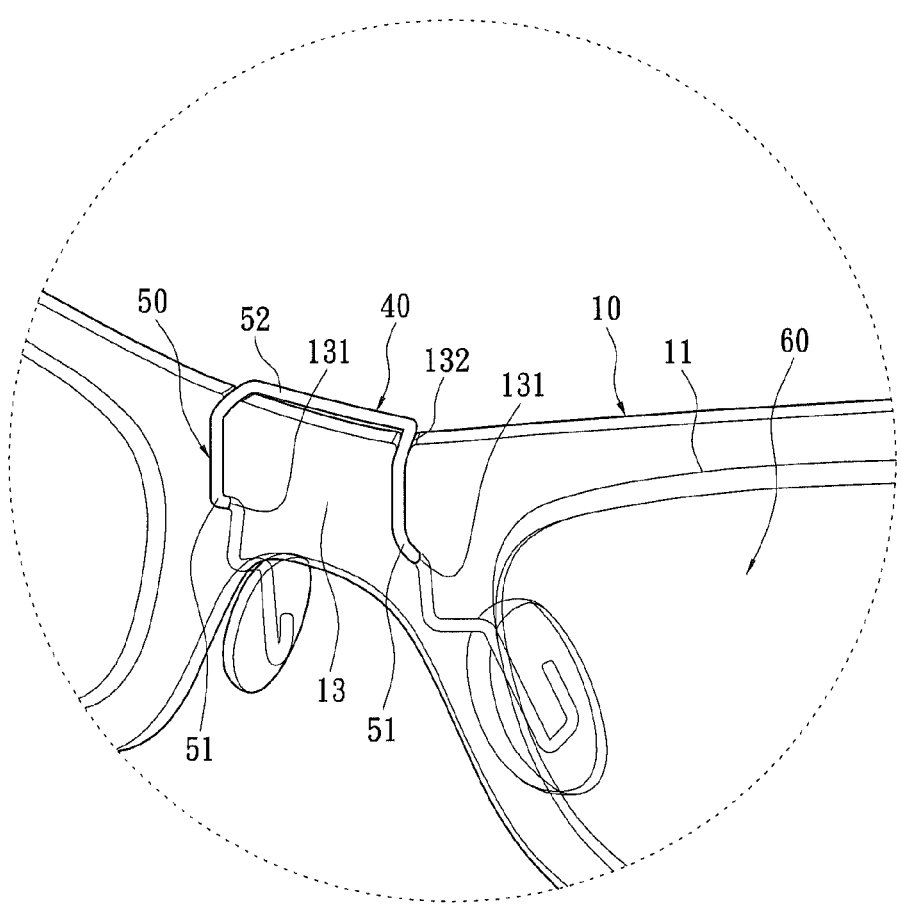
FIG. 4 is an enlarged view of a frame and a bridge in accordance with a first preferred embodiment according to the present invention.

With respect to FIGS. 3 and 4, each end portion 12 of the frame 10 has a first fastening slit 121. The instant embodiment shows two first fastening slits 121 in upper and lower arrangement (FIG. 3). However, the specific location of the first fastening slit 121 and the arranging should not be limited by the instant figures. Furthermore, the frame 10 includes a first fastening slit 122 defined at the outer edge of the end portion 12. The middle portion 13 of the frame 10 has a second fastening slit 131. The instant embodiment shows a second fastening slit 132 pierced at right-hand and left-hand sides of a middle portion 13 (FIG. 4). Furthermore, the frame 10 has a second fastening slit 132 at the edge of the middle portion 13. However, the specific location and arrangement of the slot and slit patterns should not be limited by the instant figures.

Each elastic engagement member 30 of the temple arms has at least one U-shaped brace portion 31 and a first fastening portion 32. Particularly, the brace portion 31 is folded from the respective temple arm 20. The connecting portion between the brace portions 31 forms a first fastening portion 32. The quantity and configuration of the first fastening portion 32 corresponds to the arrangement of the first fastening slit 122. For instance, FIGS. 2 and 3 show two brace portions 31 in a separation arrangement for insetting the slot 121. However, the specific configuration of the brace portion is not limited by the instant drawings.

The elastic clip member 50 comprises two rod portions 51 and a second fastening portion 52. Particularly, the connecting portion between the rod portions 51 forms the second fastening portion 52. The configuration of the second fastening portion 52 corresponds to the arrangement of the second fastening slit 132. For instance, FIGS. 2 and 4 show a second fastening portion 52 having two ends respectively connecting the two rods 51, forming a U-shape. However, the configuration of the second fastening portion is not limited to the instant drawings.

The brace portion 31 of each elastic engagement member 30 of the temple arm 20 clasps the inner side of the respective end portion 12 of the frame 10 for insetting the respective slot 121 therein. The first fastening portion 32 of the elastic engagement member 30 clasps the outer side of the respective end portion 12 of the frame 10 for insetting onto the first fastening slit 122. The two temple arms 20 are therefore secured to the frame 10

The rod portions 51 of the elastic clip member 50 passes through the through-holes 131 of the middle portion 13 of the frame 10. The second fastening portion 52 insets onto the second fastening slit 132 of the frame 10. Thus, the elastic clip member 50 (and the bridge 40) is secured to the middle portion 13 of the frame 10.

Figure 5:
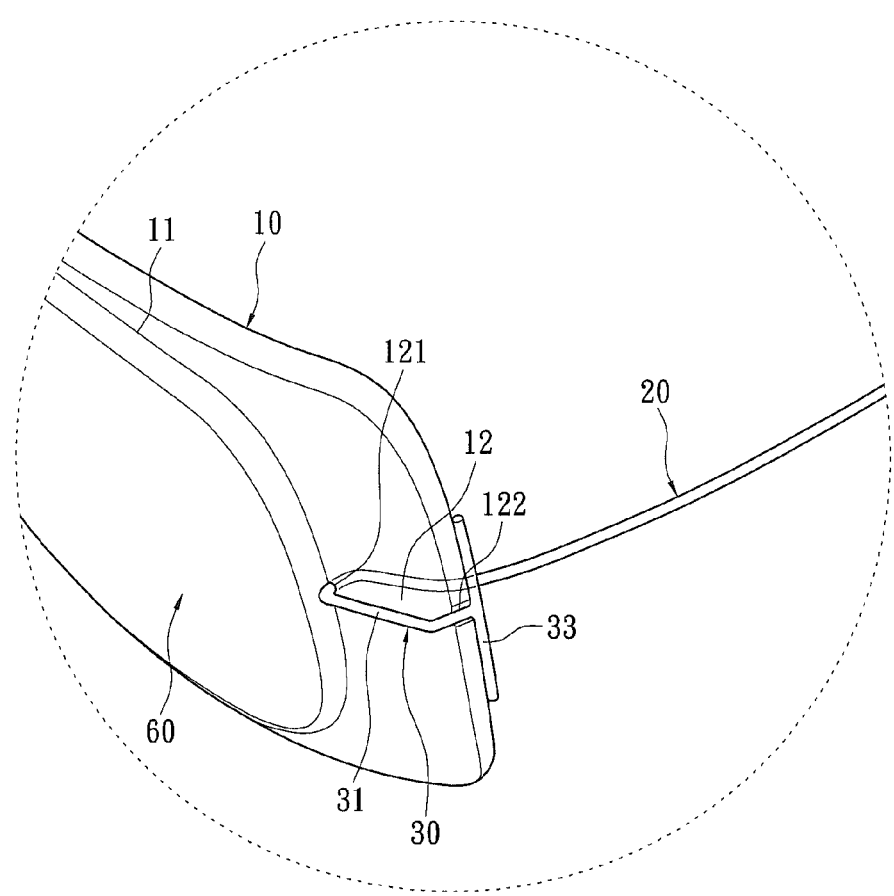
FIG. 5 is an enlarged view of the frame and the temple in accordance with a second preferred embodiment according to the present invention.

Referring to FIG. 5, a second embodiment is provided according to the present invention. Same numerals are applied to the same parts in the first embodiment, and the difference between the first and the second embodiments is discussed below:

Only single slot 121 is applied to the inner side of each end portion 12 of the frame 10. Only a single brace portion 31 is applied to each elastic engagement member 30; only a single first fastening portion 31 is applied to connect the brace portion 31. The brace portion 31 is U-shaped; the first fastening portion 33 is T-shaped. The brace portion 31 clasps the inner side of the respective end portion 12 for insetting onto the slot 121; the first fastening portion 33 clasps the outer side of the respective end portion 12 for insetting onto the first fasten slit 122.

Figure 6:
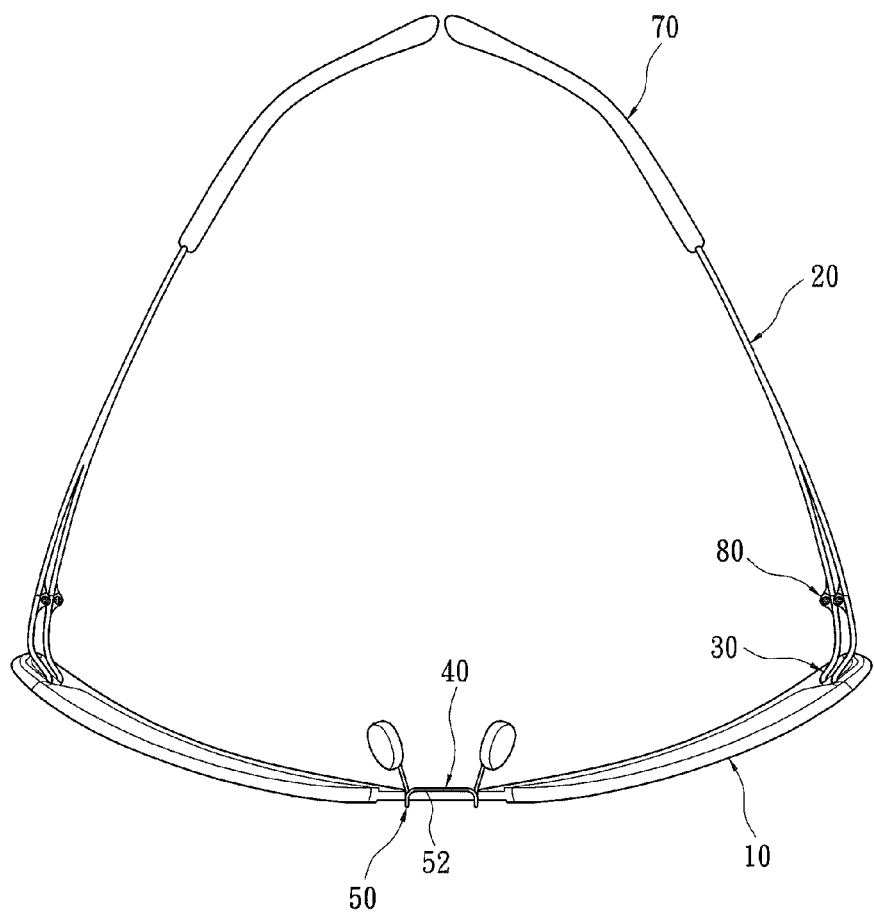
FIG. 6 is a top view of a glasses structure in accordance with a third preferred embodiment according to the present invention.

With respect to FIG. 6, a third embodiment of the present invention is provided. Same numerals are applied to the same parts in the first embodiment, and the difference between the first and the third embodiments is discussed below:

Each temple arm 20 has a foldable hinge 80 arranged at a mid section thereof; the foldable hinge 80 is set behind the elastic engagement member 30 to enable foldable function to the glasses for easy storing. The foldable hinge 80 could be applied to temple 20 in the second embodiment (not shown in the figures) for achieving the same foldable function.

It is worth mentioning that the temple arms are linked to the frame by the elastic engagement members. The bridge is linked to the frame by the clip member. The main structure of the glasses is linked together without screws or means of soldering. Thus, the instant disclosure provides a simple yet secure eye glasses structure with convenient assembly.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A glasses structure comprising:
   a frame having two end portions and a middle portion;
   two temple arms, each having an elastic engagement member at a front end, the elastic engagement member clamping onto the end portion of the frame; and
   a bridge having an elastic clip member clamping the middle portion of the frame.

2. The glasses structure according to claim 1, wherein each end portion of the frame includes a slot recessed at an inner side thereof, and each elastic engagement member has a brace portion being U-shaped; the brace portion of the elastic engagement member clasps the inner side of the respective end portion of the frame for insetting onto the slot thereof.

3. The glasses structure according to claim 2, wherein each end portion of the frame includes a first fastening slit defined at an outer side thereof, each elastic engagement member includes a first fastening portion joined to the brace portion thereof; the first fastening portion of the elastic engagement member clasps the outer side of the respective end portion of the frame for insetting onto the first fastening slit pattern.

4. The glasses structure according to claim 3, wherein the middle portion of the frame has two through-holes pierced at right-hand and left-hand sides thereof and separating from each other; the elastic clip member includes two rods passing through the two through-holes respectively.

5. The glasses structure according to claim 4, wherein the middle portion of the frame has a second fastening slit defined thereof, the elastic clip member includes a second fastening portion connected between the two rods for insetting onto the second fastening slit of the middle portion of the frame.

6. The glasses structure according to claim 5, wherein the first fastening portion of the elastic engagement member is U-shaped.

7. The glasses structure according to claim 5, wherein the second fastening portion of the elastic clip member is U-shaped and has two ends respectively connecting the two rods.

8. The glasses structure according to claim 5, wherein the first fastening portion of the elastic engagement member is T-shaped.

9. The glasses structure according to claim 1, wherein each temple has a foldable hinge arranged at a mid section thereof; the foldable hinge is set behind the elastic engagement member.

10. The glasses structure according to claim 1, wherein the frame includes two lens fitting portions adjacent to the two end portions respectively, and each lens fitting portion encircles a lens fitting therein.

* * * * *